US008996038B2

(12) United States Patent
Baek et al.

(10) Patent No.: US 8,996,038 B2
(45) Date of Patent: Mar. 31, 2015

(54) METHOD FOR PROVIDING IDLE SCREEN LAYER ENDOWED WITH VISUAL EFFECT AND METHOD FOR PROVIDING IDLE SCREEN BY USING THE SAME

(75) Inventors: Sung-Hwan Baek, Suwon-si (KR); Jin-Yong Kim, Suwon-si (KR); Kyoung-Sik Yoon, Seongnam-si (KR); Hee-Woong Choi, Seoul (KR); In-Won Jong, Anyang-si (KR); Hee-Kyung Jeon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 761 days.

(21) Appl. No.: 11/982,027

(22) Filed: Oct. 31, 2007

(65) Prior Publication Data
US 2008/0153551 A1    Jun. 26, 2008

Related U.S. Application Data

(63) Continuation-in-part of application No. 11/789,424, filed on Apr. 24, 2007.

(30) Foreign Application Priority Data

May 24, 2006    (KR) .................................. 2006-46629

(51) Int. Cl.
*H04W 24/00*    (2009.01)
*H04M 1/725*    (2006.01)

(52) U.S. Cl.
CPC ...... *H04M 1/72544* (2013.01); *H04M 1/72572* (2013.01)
USPC ..... 455/457; 455/466; 455/154.2; 455/253.1; 345/4; 345/9; 345/13; 345/176; 715/203; 715/233; 715/240; 715/273

(58) Field of Classification Search
CPC ................... H04M 1/72544; H04M 2201/38; H04M 2207/18; G06F 3/1454; G06F 3/14; G06F 3/038; G09G 2340/145; G09G 5/006; G09G 2340/10; G09G 2340/12; G09G 5/377; H04W 4/02; H04W 48/18; H04B 1/034; H04B 1/0483; H04B 1/401
USPC ............ 455/457, 466, 154.2, 253.1; 345/4, 9, 345/13, 176; 715/203, 233, 240, 273
See application file for complete search history.

(56) References Cited

U.S. PATENT DOCUMENTS 6,178,377 B1 *   1/2001   Ishihara et al. ............... 701/200
6,496,780 B1    12/2002   Harris et al.
(Continued)

FOREIGN PATENT DOCUMENTS

| EP | 1650937 | 4/2006 | ............ H04M 1/725 |
| KR | 2004-46053 | 6/2004 | ............... H04B 1/40 |
| KR | 10-2005-0022136 A | 3/2005 | |

(Continued)

OTHER PUBLICATIONS

Manzen, Yoshihisa; Patent Application Publication No: US 2003/228873 A1; Publication Date: Dec. 11, 2003; "Portable Terminal and Position Information Conversion System;". . . .

*Primary Examiner* — Nimesh Patel
(74) *Attorney, Agent, or Firm* — Cha & Reiter, LLC (57) ABSTRACT

A method for displaying an idle screen, which is varied depending on a specific condition of a mobile communication terminal, for better graphic impressions. When the user of the mobile communication terminal travels between countries, and a border crossing is detected, a landmark image of a corresponding country is displayed on the idle screen. In addition, an animation effect is displayed on the idle screen so as to inform of the occurrence of the corresponding event. Accordingly, a novel graphic effect is provided to the user via a user interface having enhanced entertaining features.

13 Claims, 12 Drawing Sheets

(56) References Cited

U.S. PATENT DOCUMENTS

| | | |
|---|---|---|
| 7,599,795 B1 | 10/2009 | Blumberg et al. |
| 2003/0227922 A1* | 12/2003 | Horvath et al. ............ 370/395.3 |
| 2004/0080434 A1* | 4/2004 | Watanabe et al. ......... 340/995.1 |
| 2004/0121823 A1* | 6/2004 | Noesgaard et al. ........ 455/575.1 |
| 2004/0204127 A1* | 10/2004 | Forlines et al. ............... 455/566 |
| 2005/0052341 A1* | 3/2005 | Henriksson ...................... 345/4 |
| 2005/0088544 A1* | 4/2005 | Wang ........................... 348/239 |
| 2005/0107097 A1* | 5/2005 | Bahl et al. .................. 455/456.6 |
| 2005/0113088 A1* | 5/2005 | Zinn et al. .................. 455/435.2 |
| 2006/0098085 A1* | 5/2006 | Nichols et al. ............ 348/14.07 |
| 2007/0094596 A1* | 4/2007 | Nielsen et al. ................ 715/700 |

FOREIGN PATENT DOCUMENTS

| | | | | |
|---|---|---|---|---|
| KR | 2005-32258 | 4/2005 | ............... | H04B 1/40 |
| KR | 10-2005-0073921 A | 7/2005 | | |
| KR | 2006-25679 | 3/2006 | ............... | H04B 1/40 |
| KR | 10-0588046 B1 | 6/2006 | | |
| KR | 2007-01347 | 1/2007 | ............... | H04B 1/40 |
| WO | 02-23462 A1 | 3/2002 | | |
| WO | WO 2005/003954 | 1/2005 | ................ | G06F 3/14 |
| WO | WO 2005/039160 | 4/2005 | ................ | H04M 1/72 |

* cited by examiner

METHOD FOR PROVIDING IDLE SCREEN LAYER ENDOWED WITH VISUAL EFFECT AND METHOD FOR PROVIDING IDLE SCREEN BY USING THE SAME

CROSS REFERENCE TO RELATED APPLICATIONS

This application is a continuation-in-part of U.S. application Ser. No. 11/789,424 filed Apr. 24, 2007 and claims the benefit of the earlier U.S. filing date in accordance with 35 U.S.C. §120, in which the earlier filed U.S. application is incorporated by reference.

PRIORITY

This application claims priority under 35 U.S.C. §119 to an application entitled "Method For Providing Idle Screen Layer Endowed With Visual Effect And Method For Providing Idle Screen By Using The Same" filed with the Korean Intellectual Property Office on May 24, 2006 and assigned Serial No. 2006-46629, the contents of which are incorporated herein by reference.

BACKGROUND OF THE INVENTION

1. Field of the Invention

The present invention relates to a mobile communication terminal, and more particularly to a method for providing an idle screen of a mobile communication terminal.

2. Description of the Related Art

Typically, mobile terminals include various convenience features for enhancing the use of the terminals in addition to the basic communication function. As display technologies become more advanced, mobile terminal displays have become larger and capable of displaying more colors. As user demands have increased, it has become more important to utilize the screen space of mobile terminal displays more efficiently and creatively to improve user convenience.

However, although conventional mobile terminals can provide desired sounds and screens based on download services, the idle screens are typically the same. For example, a user is typically only allowed to select an image, name, and/or a clock to be displayed at predetermined locations on an idle screen. Although content such as, photos, moving pictures, etc. may be displayed on the idle screen in addition to the images, the amount of information available from such an idle screen is limited. As a result, conventional mobile terminals cannot provide users with satisfactory interfaces.

When a user of a conventional mobile communication terminal desires to modify an image displayed on a display screen, the user must manually modify everything displayed on the display screen using various key operations. Accordingly, conventional mobile communication terminals cannot provide means for easily modifying the image displayed on the screen. As such, the idle screen of conventional mobile communication terminals can be modified only through key operations in a limited and passive fashion. Accordingly, there is a need for an idle screen display which could be dynamically modified and suited to a specific condition of the mobile communication terminals.

SUMMARY OF THE INVENTION

Accordingly, the present invention has been made to solve the above-mentioned problems occurring in the prior art, and an object of the present invention is to provide a method for providing idle screen layers having a visual effect so that the idle screen of a mobile communication terminal can be varied depending on a specific condition of the terminal in order to provide the user with a new and pleasant interface, as well as a method for providing an idle screen by using the same.

Another object of the present invention is to provide a method for providing idle screen layers having a visual effect so that different idle screens are provided when the user of a mobile communication terminal travels between countries, as well as a method for providing an idle screen by using the same.

In order to accomplish these objects, there is provided a method for providing layers of an idle screen having a visual effect in a mobile communication terminal, the method including providing a background layer for displaying a background image corresponding to a time period based on a current location of the mobile communication terminal; providing a country-based landmark layer for displaying a landmark image on the idle screen while being superimposed on the background image displayed by the background layer, the landmark image corresponding to locational information received when the mobile communication terminal moves; and providing an event-related layer for displaying a predetermined animation effect when an event has occurred in the mobile communication terminal, the animation effect being superimposed on the idle screen so as to inform of the event.

In accordance with another aspect of the present invention, there is provided a method for providing an idle screen having a visual effect in a mobile communication terminal, the method including determining whether locational information is received when the mobile communication terminal moves; displaying an idle screen with a landmark image superimposed on a background image when it is determined that locational information has been received, the landmark image corresponding to the locational information, the background image corresponding to a time zone at a current location of the mobile communication terminal; monitoring occurrence of an event in the mobile communication terminal while the idle screen is displayed; and displaying a predetermined animation effect when an event has occurred, the animation effect comprising animation data being superimposed on the idle screen so as to inform of the event.

BRIEF DESCRIPTION OF THE DRAWINGS

The above and other features, and advantages of the present invention will be more apparent from the following detailed description taken in conjunction with the accompanying drawings, in which.

DETAILED DESCRIPTION OF THE EXEMPLARY EMBODIMENTS

Hereinafter, preferred exemplary embodiments of the present invention will be described with reference to the accompanying drawings. In the following description of the present invention, a detailed description of known functions and configurations incorporated herein is omitted to avoid making the subject matter of the present invention unclear.

The present invention teaches a method for providing different idle screens depending on a specific condition of a mobile communication terminal so that a user is provided with a corresponding graphical impression. According to the present invention, when a user travels between countries, a corresponding border crossing is detected so that the idle screen switches from a landmark image of a country before the crossing to that of corresponding a country located on the other side of the crossing. In addition, when an event has occurred, an animation effect corresponding to that event is output on the idle screen. As such, the user of a mobile communication terminal is provided with a user interface having enhanced entertainment features.

The components and operation of a mobile communication terminal incorporating the above-mentioned functions will now be described with reference to FIG. 1, which illustrates the construction of a mobile communication terminal according to the present invention.

Figure 1:
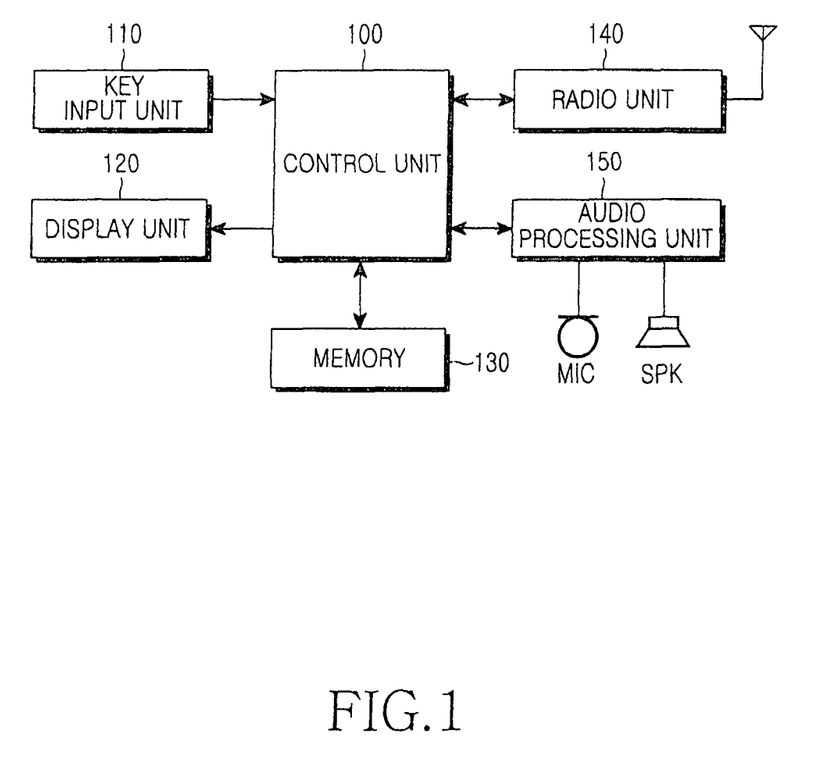
FIG. 1 is a block diagram illustrating the construction of a mobile communication terminal according to the present invention.

Referring to FIG. 1, a mobile communication terminal according to the present invention includes a control unit 100, a key input unit 110, a display unit 120, a memory 130, a radio unit 140, and an audio processing unit 150.

The control unit 100 controls the overall operation of the mobile communication terminal. Particularly, the control unit 100 controls the display unit 120 so as to display different idle screens depending on a specific condition of the mobile communication terminal. Based on the current location of the mobile communication terminal, a corresponding landmark image is displayed on the idle screen. Specifically, when the user of the mobile communication terminal travels between countries, a landmark image corresponding to a country in which the user is currently located is output on the idle screen. As used herein, the landmark image refers to an image of a symbol representing a corresponding country, and the type of the image is not limited herein as long as it is typical of a corresponding country.

More particularly, when the user of the mobile communication terminal travels between countries or cities, the control unit 100 receives mobile communication network identification codes from mobile communication network exchange offices, which provide mobile communication network services in corresponding service regions. The mobile communication network identification codes include an MCC (Mobile Country Code) and an MNC (Mobile Network Code). It can be easily understood by those skilled in the art that, in addition to the above-mentioned method, any type of method may be used to detect the border crossing and obtain network information, including the MCC, from corresponding networks by the control unit 100 (e.g., a method based on roaming), as long as the MCC is obtainable.

Based on the received mobile communication network identification code, the control unit 100 loads a landmark image corresponding to the MCC and displays it on the display unit 120. Then, the control unit 100 displays a dynamically changing icon on the landmark image, which acts as a background, so as to inform of an event, particularly an incoming call, a message (e.g., Short Messaging Service, (SMS), Multimedia Messaging Service (MMS), e-mail, etc.), or an alarm. The icon moves randomly. As such, according to the present invention, an idle screen is varied in real time based on information regarding the current location of the mobile communication terminal. In addition, a dynamically changing icon informs of an event. This enhances the visual effect provided by the mobile communication terminal.

The key input unit 110 acts as an interface with the user. To this end, the key input unit 110 has includes keys such as function keys, numeric keys 0-9, and/or special keys *, # and provides the control unit 100 with key input data in response to the user's key input. Particularly, when one of the keys is operated, the key input unit 110 outputs corresponding key input data, which is transmitted to the control unit 100. Then, the control unit 100 identifies the operated key based on the data and performs a corresponding operation.

The display unit 120 displays data based on the key input data from the key input unit 110 under the control of the control unit 100. In addition, the display unit 120 displays the operating condition of the mobile communication terminal, as well as various types of information, via icons and characters. When the user wants to set up or drive a necessary function, the display unit 120 provides a visual expression of the corresponding condition under the control of the control unit 100. The display unit 120 also displays different display landmark images as the user of the mobile communication terminal travels between countries or cities.

The memory 130 consists of a ROM and a RAM for storing a number of programs and data. According to the present invention, the memory 130 stores received mobile communication network identification codes and landmark images of countries corresponding to the identified mobile communication networks. In addition, the memory 130 stores data regarding display items for respective layers, which is necessary to display landmark images for respective countries as the background screen.

The radio unit 140, which is connected to the control unit 100, converts audio and control data into radio signals and transmits them. In addition, the radio unit 140 receives radio signals, converts them into audio and control data, and outputs them.

The audio processing unit 150, which is connected to the control unit 100, converts audio data from the control unit 100 into audible sounds and outputs them via a speaker. In addition, the audio processing unit 150 converts audio signals from a microphone into data and transmits it to the control unit 100. If necessary, the audio processing unit 150 may be adapted to output sound effects based on the movement of the icon, which informs of an event, on the idle screen. When the icon looks like an airplane, for example, a booming sound is output.

A layer structure of the screen for outputting a visual effect depending on a specific condition of the mobile communication terminal, which is constructed according to the present invention, will now be described with reference to FIG. 2, which shows a layer structure of an idle screen of a mobile communication terminal according to the present invention.

Figure 2:
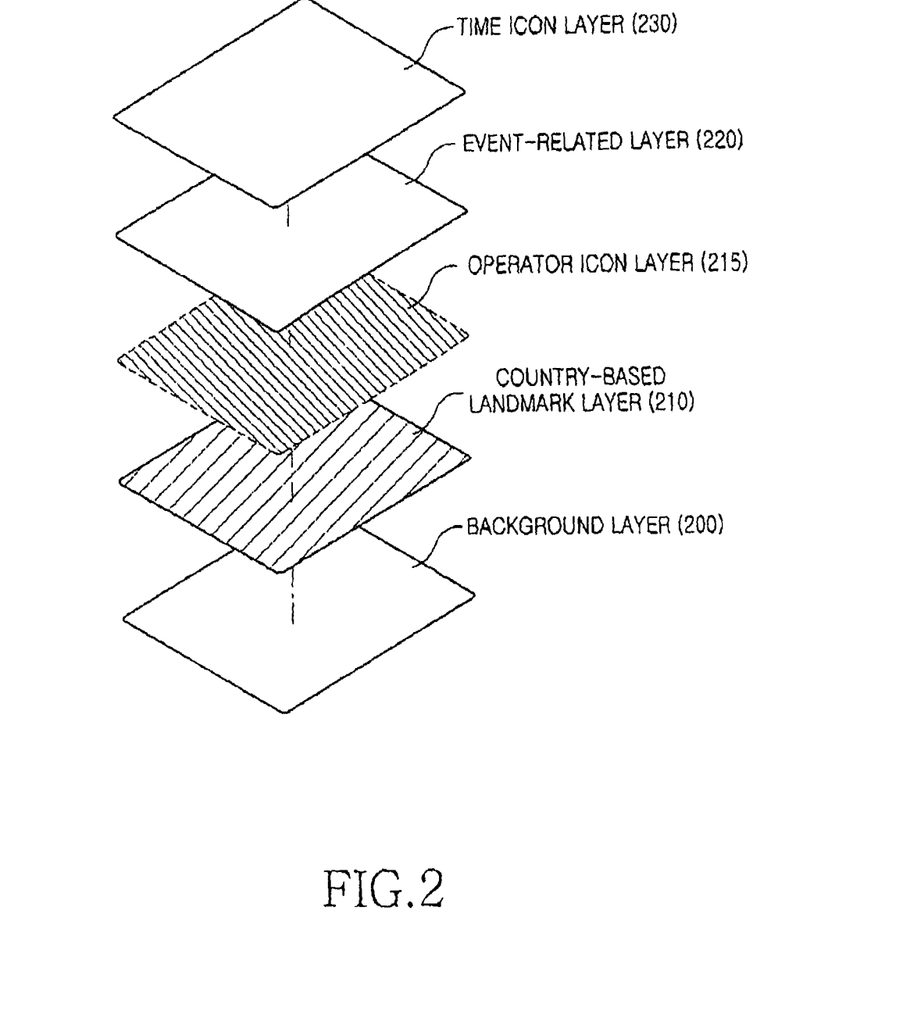
FIG. 2 is an exploded perspective view illustration of a layer structure of an idle screen of a mobile communication terminal according to the present invention.

Referring to FIG. 2, an idle screen of a mobile communication terminal according to the present invention includes a country-based landmark layer 210 for providing landmark images (e.g., symbolic objects, buildings, etc.) for respective nations when the user of the mobile communication terminal travels between countries or cities, a background layer 200 for providing a background, which varies depending on the time period, for the landmark images, and a time icon layer 230 for providing an icon or image which informs of the time at a corresponding location. The idle screen further includes an event-related layer 220 for informing of the occurrence of an event and adding a predefined animation effect for better visual impressions and an operator icon layer 215 for providing a corresponding operator landmark item when the operator network has been changed. In principle, the items (including images) provided by respective layers are superimposed upon each other in such a manner that they can be recognized visually. It should be understood that the order of the layers shown in FIG. 2 is illustrative only in that other ordering with the layers is possible.

An example of the idle screen, which is constructed as mentioned above, is shown in FIG. 3A. As the user of the mobile communication terminal travels between countries or cities, the country-based landmark layer 210 displays different landmark images on a background provided by the background layer 200 so that the displayed landmark image reflects the current location of the user.

According to the present invention, the background layer 200 provides different background images depending on the time period (e.g., dawn, morning, noon, afternoon, evening, night) based on the current location of the mobile communication terminal. The background layer 200 may also provide background images depending on the season.

The country-based landmark layer 210 provides landmark images for respective countries as the user of the mobile communication terminal travels between countries or cities. The landmark images are superimposed on the background provided by the background layer 200.

When the mobile communication terminal accesses an operator network based on an MNC included in a mobile communication network identification code, the operator icon layer 215 provides an item (e.g., an image or icon) as the operator landmark so as to indicate the operator network to which the mobile communication terminal is currently connected. An example of the operator landmark provided by the operator icon layer 215 is labeled 400 in FIG. 3A. Alternatively, the operator landmark may appear on the idle screen when the mobile communication terminal switches from the original operator network to another operator network.

The event-related layer 220 provides various types of animation effects so as to inform of the occurrence of events (e.g., incoming messages, etc.). The animation effects may include icons moving along random trajectories such as airplanes in an air show and/or flames becoming bigger or smaller. Smoke from the airplane or colors of the flame may be varied so as to optionally indicate a specific effect related to the event.

Figure 3A:
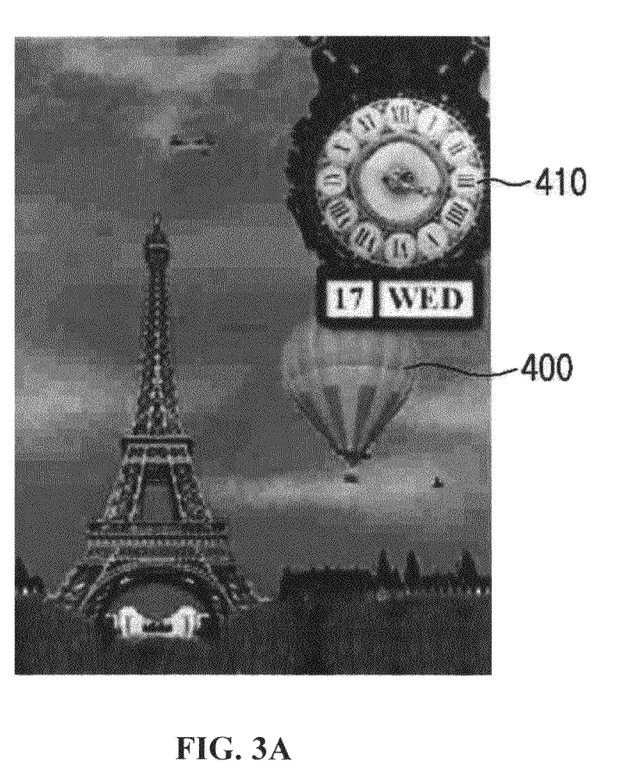
FIGS. 3A and 3B are screen shots illustrating idle screens of a mobile communication terminal according to the present invention.
Figure 3B:
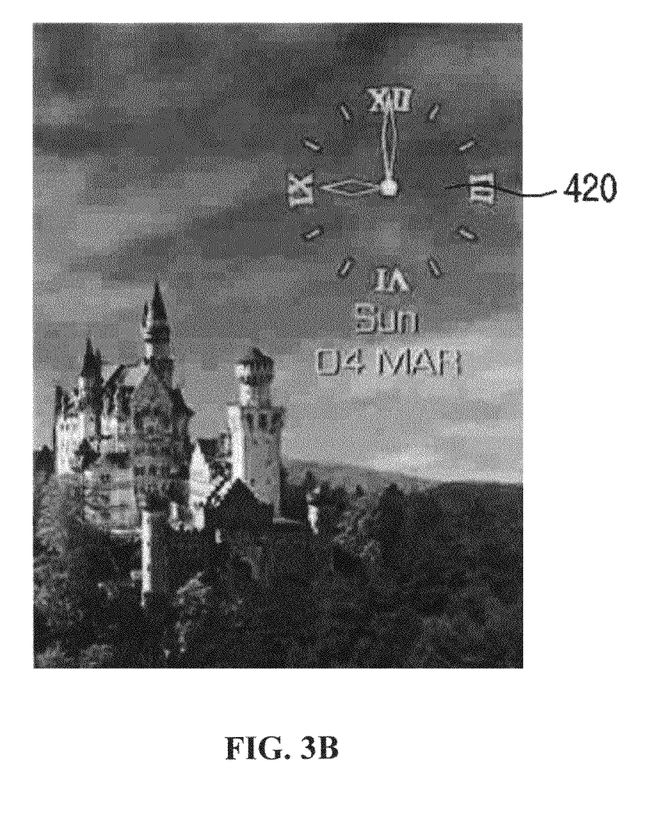

The time icon layer 230 provides various watch-type icons, including that labeled 410 in FIG. 3A and that labeled 420 in FIG. 3B, so as to inform of the current time based on the location of the mobile communication terminal.

Figure 4A:
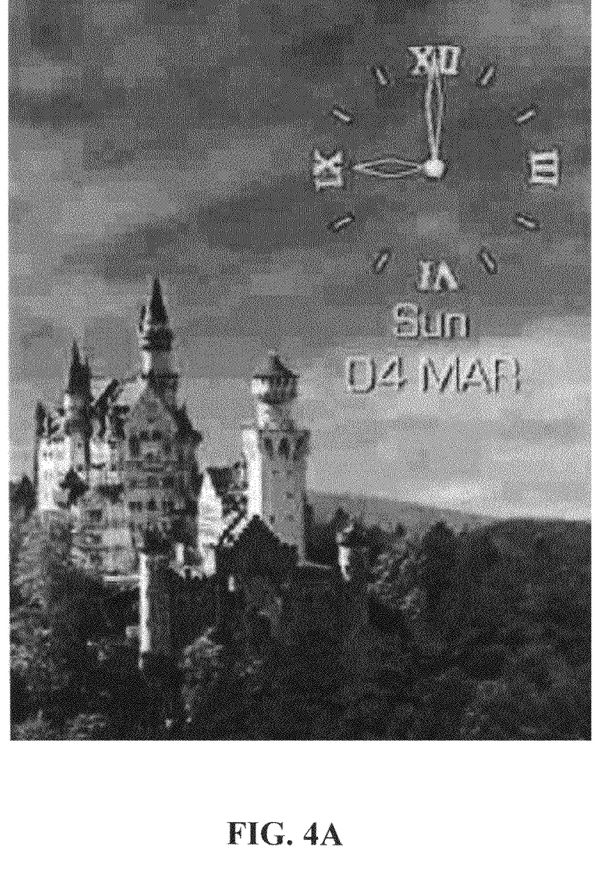
FIGS. 4A to 4C are screen shots illustrating idle screens displaying landmark images for respective countries according to the present invention.
Figure 4B:
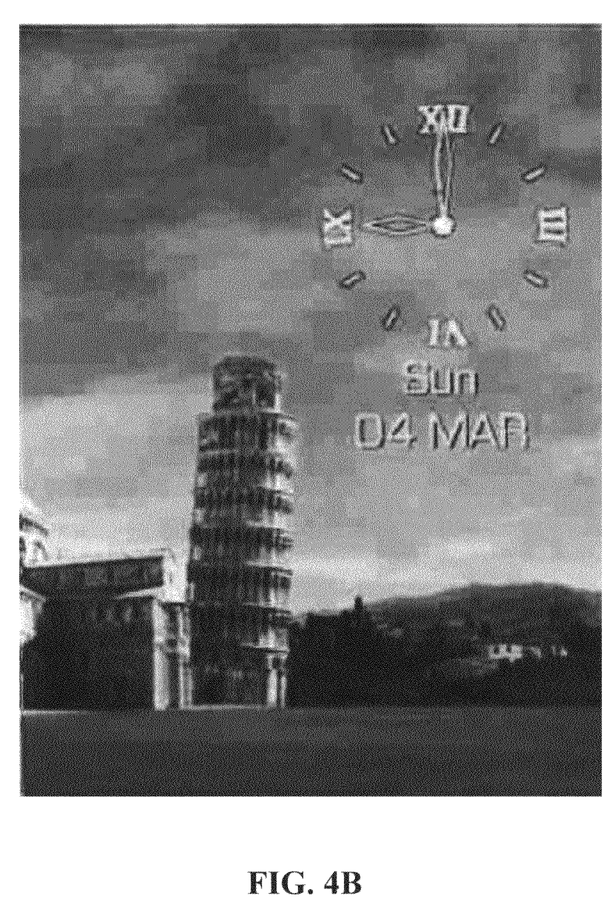
Figure 4C:
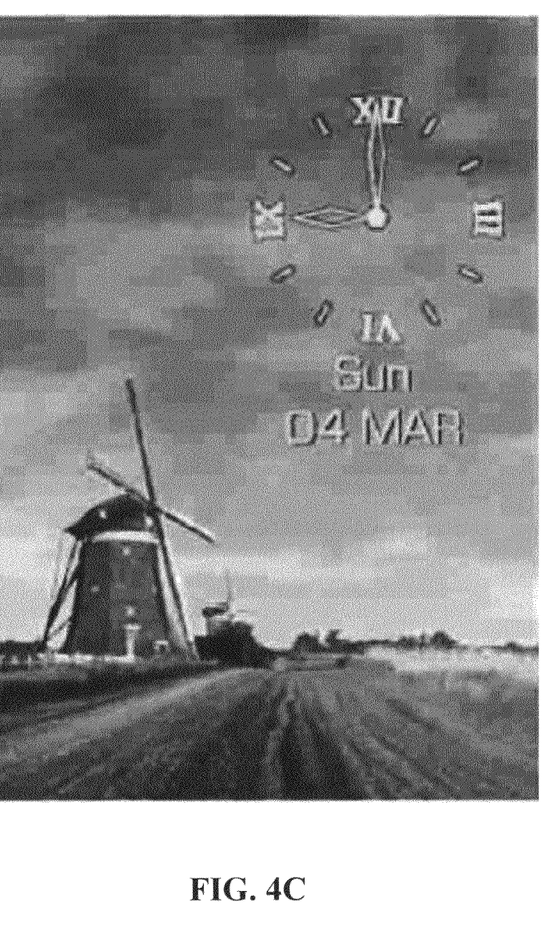

FIGS. 4A to 4C illustrate different country-based landmark images depending on the MCC provided by corresponding networks when the user of the mobile communication terminal travels between countries.

Particularly, FIG. 4A shows an image of an old castle displayed on the idle screen as a landmark of Germany. When the user of the mobile communication terminal travels into Germany, the country-based landmark layer 210 provides that image while being superimposed on the background, which is provided by the background layer 200 so as to inform of the current time. FIG. 4B shows an image of Leaning Tower of Pisa, which is a landmark of Italy, when the user travels into Italy. FIG. 4C shows an image of a windmill, which is a landmark of Holland. As such, when the border crossing is detected, a corresponding landmark image is displayed as shown in FIGS. 4A to 4C. The landmark images may be created by the user as desired. Alternatively, the user may receive landmark images from content providers and select or modify them.

Figure 5A:
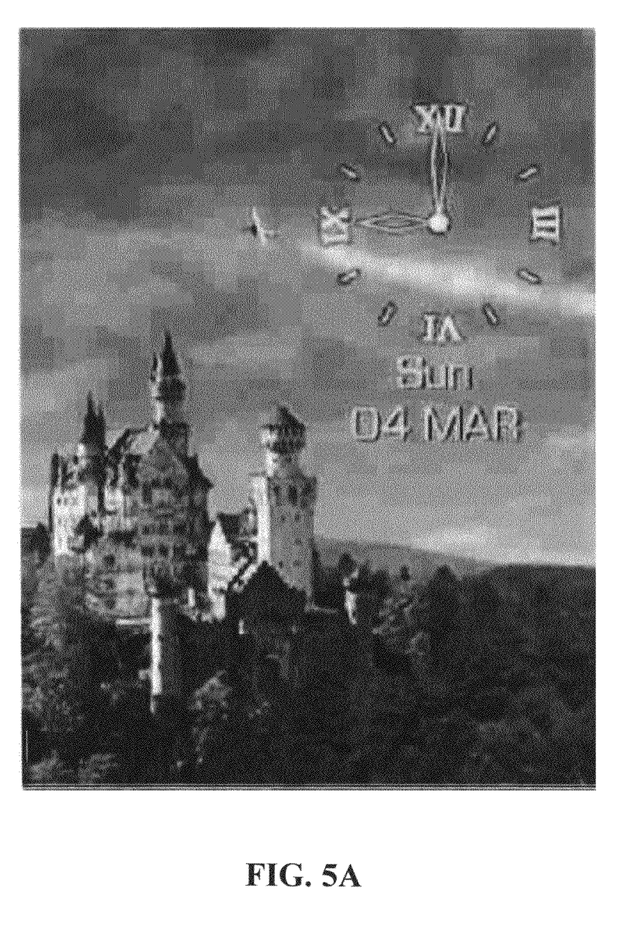
FIGS. 5A and 5B are screen shots illustrating idle screens displays when an event has occurred according to the present invention.
Figure 5B:
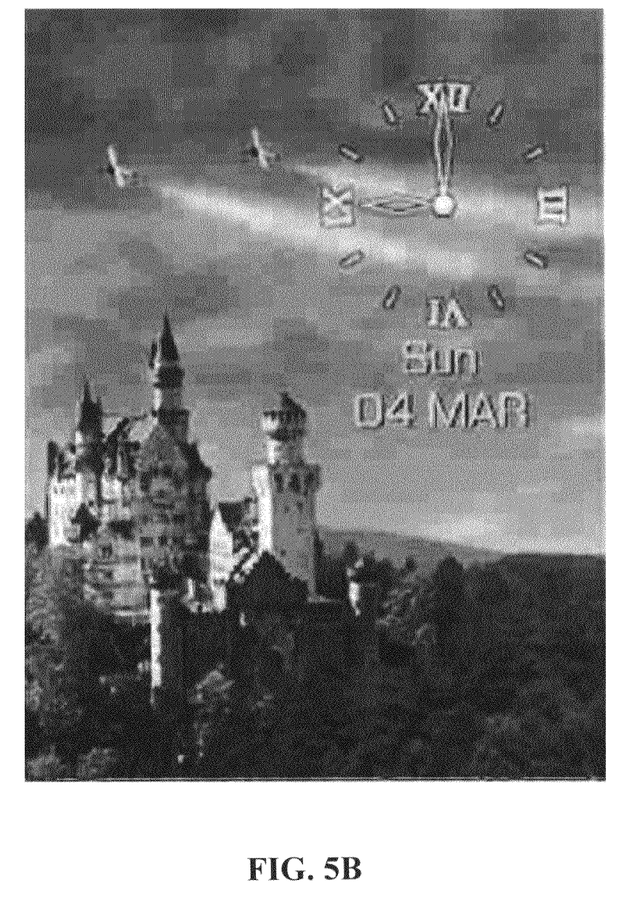
Figure 6A:
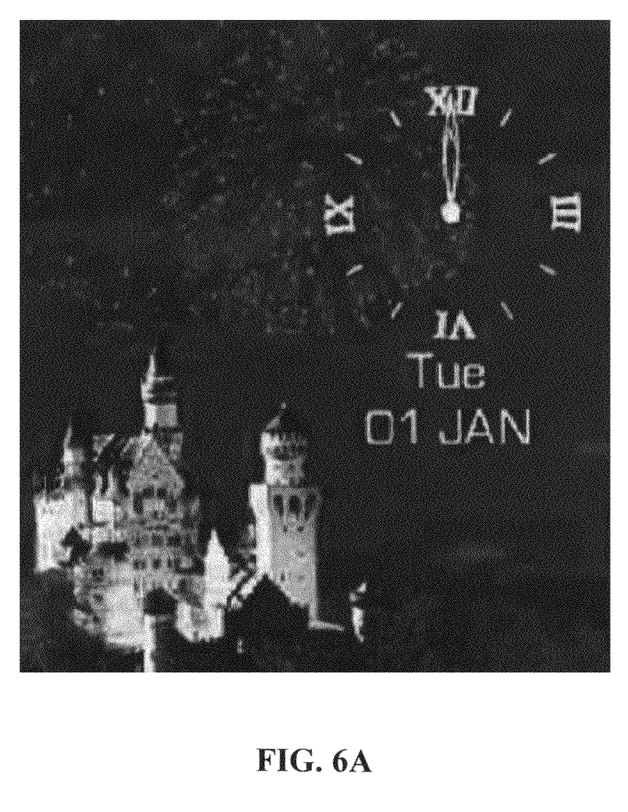
FIGS. 6A and 6B are screen shots illustrating idle screens displayed when an event has occurred according to the present invention.
Figure 6B:
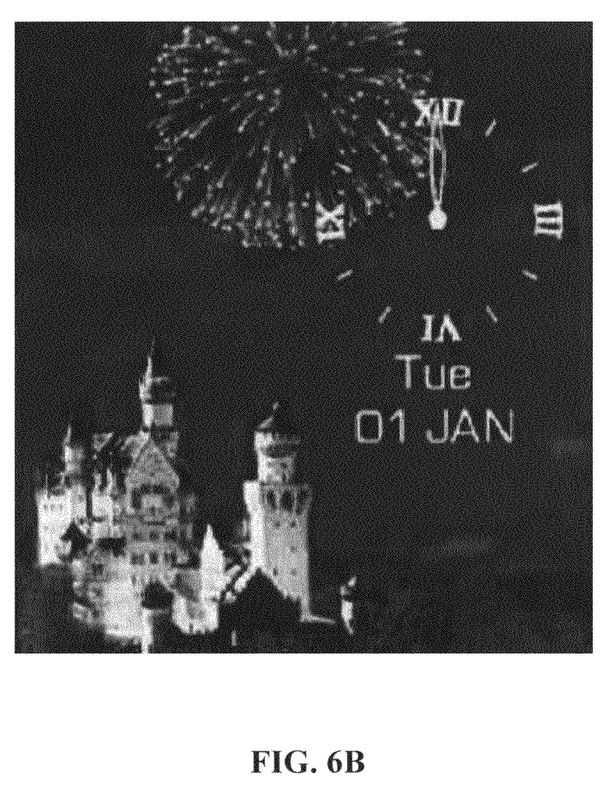

FIG. 5A illustrates an example of the idle screen displayed when an event has occurred and the event-related layer 220 provides a corresponding animation effect by moving an airplane icon as in the case of an air show. FIG. 5B illustrates another example of an idle screen displayed when two events have occurred and a corresponding animation effect is provided by varying the color of smoke from the airplane in accordance with the type of events. FIGS. 6A and 6B illustrates examples of an idle screen displayed when the background layer 200 provides background images corresponding to the time period of night and the event-related layer 220 provides animation effects on the background image according to events which have occurred. Particularly, the color of flames indicates the type of events in FIGS. 6A and 6B. As shown in the drawings, different animation effects are outputted depending on the time period based on the current time, as well as the type of events. Although airplanes and flames are given as examples of the animation effect, the type is not limited to that in the present invention. In this regard, the present invention advantageously enables the user to obtain desired information in an easy and efficient manner, because, instead of paying attention to a specific icon on the idle screen in order to obtain information associated with that icon, the user can grasp the current condition of the mobile communication terminal simply by glancing at the idle screen.

A method for providing an idle screen in various manners, as mentioned above, will now be described.

Figure 7:
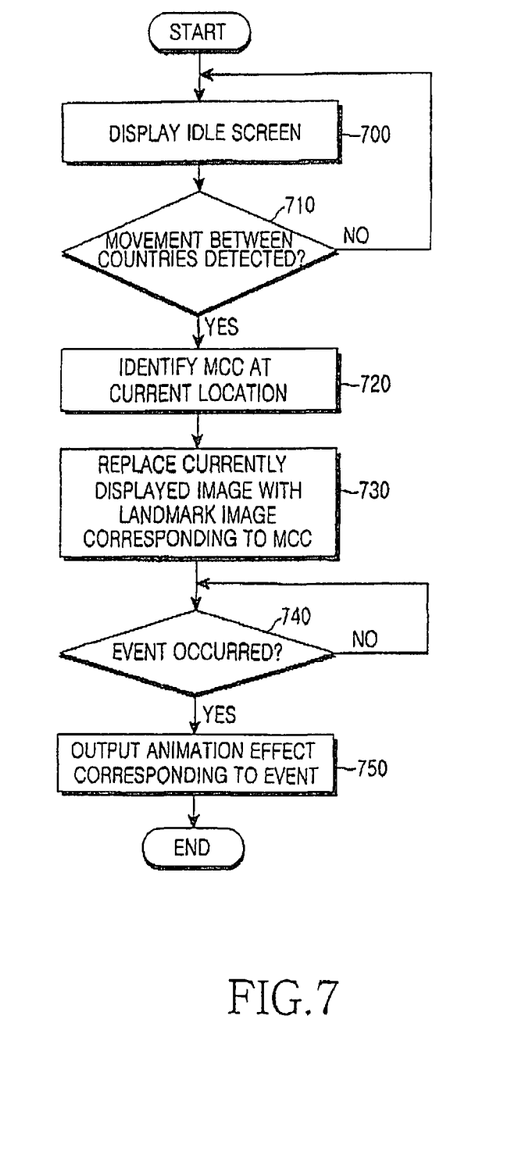
FIG. 7 is a flowchart illustrating a method for providing an idle screen, which is varied depending on a specific condition of a mobile communication terminal, by using a layer structure for the idle screen according to the present invention.

FIG. 7 is a flowchart illustrating a method for providing an idle screen, which is varied depending on a specific condition of a mobile communication terminal, by using a layer structure for the idle screen according to the present invention. Although FIGS. 4A to 5B will be referred to in the following description, the method is not limited to that in the present invention.

The control unit 100 displays an idle screen, as shown in FIG. 4B or 4C, which is based on a layer structure as shown in FIG. 2.

According to the present invention, the control unit 100 displays a landmark image, which corresponds to locational information received when the user of the mobile communication terminal travels, on the idle screen. Particularly, the control unit 100 detects border crossing of the user of the mobile communication terminal between countries or cities in step 710. When the border crossing is detected, the control unit 100 locates the terminal based on the network information received at the current location. The control unit 710 identifies an MCC at the current location based on the network information in step 720. The control unit 100 loads a country-based landmark image, which corresponds to the identified MCC, from the memory 130. The control unit 100 replaces the current landmark image on the idle screen with a landmark image corresponding to the MCC in step 730. For example, when it is detected that the user has moved into Germany, for example, the landmark image shown in FIG. 5A is output on the idle screen. The time icon layer 230 provides a corresponding watch icon, and the background layer 200 provides a background based on the corresponding time period. The icon and the background are superimposed on the landmark image and constitute the idle screen as a whole.

The control unit 100 monitors the occurrence of an event, including an incoming call, an incoming message (e.g., SMS, MMS, email, etc.), and arrival of alarm time, in step 740. When an event has occurred, the control unit 100 outputs an animation effect, as shown in one of FIGS. 5A to 6B, corresponding to the event in step 750.

Although FIGS. 3A to 6B illustrates examples of idle screens according to the present invention, particularly watch icons (e.g., see, FIGS. 3A and 3B), an old castle in Germany (e.g. see FIG. 4A), Leaning Tower of Pisa in Italy (e.g., see, FIG. 4B), a windmill in Holland (e.g., see, FIG. 4C), airplanes moving randomly as a result of events (FIGs. e.g., see, 5A and 5B), and flames (e.g., see, FIGS. 6A and 6B), the present invention is not limited to these figures. Various visual effects (including images and/or icons) may be provided depending on the choice of the user, service provider, or terminal manufacturer. The user may create his/her own visual effects or receive them from contents providers and modify them as desired.

As mentioned above, the present invention is advantageous in that it provides the user with idle screens conforming to various demands so that the user interface of the mobile communication terminal has enhanced entertaining features.

The user can freely set up and modify the visual effect on the idle screen. This facilitates development of the relevant industry.

The user can grasp the current condition of the mobile communication terminal, including the current location, time period, and occurrence of an event, simply by glancing at the idle screen.

The user is provided with a customized idle screen according to his/her taste so that the overall look and feel of the mobile communication terminal can be improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for providing layers of a stand-by screen in a mobile communication terminal, the method comprising the steps of:
    providing a background layer for displaying a background image corresponding to a time zone based on a current location of the mobile communication terminal;
    providing a landmark layer for displaying a landmark image on the stand-by screen while being superimposed upon the background image displayed by the background layer, wherein the landmark image indicates a landmark determined according to the current location of the mobile terminal from among predetermined landmarks and associated locations; and
    providing an event layer for displaying an animation data corresponding to the background image in order to show an occurrence of an event when the event has occurred in the mobile communication terminal, wherein the animation data is superimposed upon the stand-by screen;
    providing an operator icon layer for displaying a changed operator landmark image based on a mobile network code (MNC) within a locational information when an operator network has been changed;
    wherein each one of said background layer, landmark layer and event layer is configured for simultaneous display of an item in each of said background layer, landmark layer and event layer at a same time with at least another one of said background layer, landmark layer and event layer depending on a specific condition of the mobile communication terminal, and the operator landmark image corresponds to a new operator network in which said operator icon layer is configured for simultaneous display with at least another one of said background layer, landmark layer and event layer; and
    wherein display of the stand-by screen is dynamically modified by a controller to conform to a specifically changing geographic or environmental condition of the mobile communication terminal by detecting movement of the mobile communication terminal including border crossings between countries and between cities within a respective country and determining by the controller of the mobile communication terminal whether the detected movement to a current location warrants a change in display of the stand-by screen of the mobile terminal to display a current city where the mobile terminal is located.

2. The method as claimed in claim 1, further comprising providing a time icon layer for displaying a watch icon informing of time based on the current location of the mobile communication terminal in which said time icon layer is configured for simultaneous display with at least another one of said background layer, landmark layer and event layer.

3. The method as claimed in claim 2, wherein the watch icon and the operator landmark image are superimposed on the stand-by screen so as to he recognized visually.

4. The method as claimed in claim 1, wherein a watch icon and the operator landmark image are superimposed on the stand-by screen so as to be recognized visually.

5. A method for providing a stand-by screen in a mobile communication terminal, the method comprising the steps of:
    determining whether locational information is received when the mobile communication terminal moves;
    displaying a stand-by screen with a landmark image superimposed on a background image when it is determined that the locational information has been received, wherein the landmark image indicates a landmark determined according to a locational data among predetermined landmarks and the background image corresponds to a time zone at a current location of the mobile communication terminal;
    determining an occurrence of an event in the mobile communication terminal while the stand-by screen is displayed; and
    displaying an animation data corresponding to the background image in order to show an occurrence of an event when the event has occurred in the mobile communication terminal, wherein the animation data is superimposed upon the stand-by screen and the stand-by screen is configured for simultaneous display of the background image and landmark image at a same time depending on a specific condition of the mobile communication terminal;
    determining whether an operation network has changed based on a mobile network code (MNC) within the locational information while the stand-by screen is displayed; and
    displaying a changed operator landmark image superimposed upon the stand-by screen when it is determined that the operator network has been changed, wherein the operator landmark image corresponds to a new operator network;
    wherein display of the stand-by screen is dynamically modified without user intervention by a controller of the mobile terminal upon detecting movement of the mobile communication terminal including border crossings between countries and between cities within a respective country to conform to a specifically changing geographic or environmental condition of the mobile communication terminal and determining by the controller of the mobile terminal whether detected movement of the mobile communication terminal to a current location warrants a change in display of the stand-by screen of the mobile terminal to display a current city where the mobile terminal is located.

6. The method as claimed in claim 5, further comprising displaying a watch icon superimposed upon the stand-by screen so as to inform of time at the current location of the mobile communication terminal for simultaneous display with at least another one of said background image, landmark image and event image.

7. The method as claimed in claim 5, wherein the locational information of a mobile communication network identification code comprises at least one of a mobile country code (MCC), a mobile network code (MNC), and Cell ID received from a corresponding network when the mobile communication terminal moves.

8. The method as claimed in claim 7, wherein the step of displaying the stand-by screen comprises:
   identifying the mobile country code (MCC) within the locational information; and
   loading a landmark image of a country corresponding to the mobile country code (MCC) so as to display the landmark image on the stand-by screen.

9. The method as claimed in claim 1, wherein the animation data corresponds to the landmark image.

10. The method as claimed in claim 5, wherein the animation data corresponds to the landmark image.

11. A mobile communication terminal for providing a stand-by screen, the mobile communication terminal comprising:
   a memory for storing a background image corresponding to a time zone, a landmark image corresponding to a locational information, and an animation data based on an event category;
   a controller for loading and controlling display of the landmark image superimposed upon the background image corresponding to the time zone displayed on the stand-by screen, detecting movement of the mobile communication terminal and determining whether the landmark image associated with a current location should be replaced, determining whether an event has occurred, and displaying the animation data when the event occurred, wherein the landmark image indicates a landmark determined according to a locational data among predetermined landmarks, and the animation data is superimposed upon the stand-by screen based on an event category; and
   a display unit for displaying the stand-by screen in which more than one of the background image, landmark image and animation data based on the event category are configured for simultaneous display at a same e depending on a specific condition of the mobile communication terminal;
   wherein display of the stand-by screen is dynamically modified to conform to a changing condition of the mobile communication terminal and the controller of the mobile communication terminal is configured to determine whether the detected movement of the mobile terminal including border crossings between countries and between cities within a respective country warrants a change in display of the stand-by screen of the mobile terminal to display a current city where the mobile terminal is located;
   wherein the memory further stores an operator landmark image, and the controller further determining whether an operator network has been changed based on a mobile network code (MNC) within the locational information, loading the operator landmark image from the memory when the operator network has been changed, and displaying the operator landmark image superimposed upon the stand-by screen of the display unit.

12. The mobile communication terminal as claimed in claim 11, wherein the controller further controlling display of a watch icon that displays a time based on the current location of the mobile communication terminal, and the watch icon is superimposed upon the stand-by screen for simultaneous display with more than one of said background image, landmark image and animation data based on the event category.

13. The mobile communication terminal as claimed in claim 11, wherein the locational information comprises a mobile communication network identification code comprising at least one of a mobile country code (MCC), a mobile network code (MNC), and Cell ID received from a corresponding network when the mobile communication terminal moves.

* * * * *

UNITED STATES PATENT AND TRADEMARK OFFICE
CERTIFICATE OF CORRECTION

| | | |
|---|---|---|
| PATENT NO. | : 8,996,038 B2 | Page 1 of 1 |
| APPLICATION NO. | : 11/982027 | |
| DATED | : March 31, 2015 | |
| INVENTOR(S) | : Sung-Hwan Baek et al. | |

It is certified that error appears in the above-identified patent and that said Letters Patent is hereby corrected as shown below:

In the Claims

Column 8, Claim 3, Line 27 should read as follows:
--...to be recognized visually...--

Column 10, Claim 11, Lines 10-11 should read as follows:
--...a same time depending...--

Signed and Sealed this
Seventh Day of July, 2015

Michelle K. Lee
*Director of the United States Patent and Trademark Office*